S. NICOLSON.
Railroad Alarm.
No. 97. Reissued July 3, 1847.
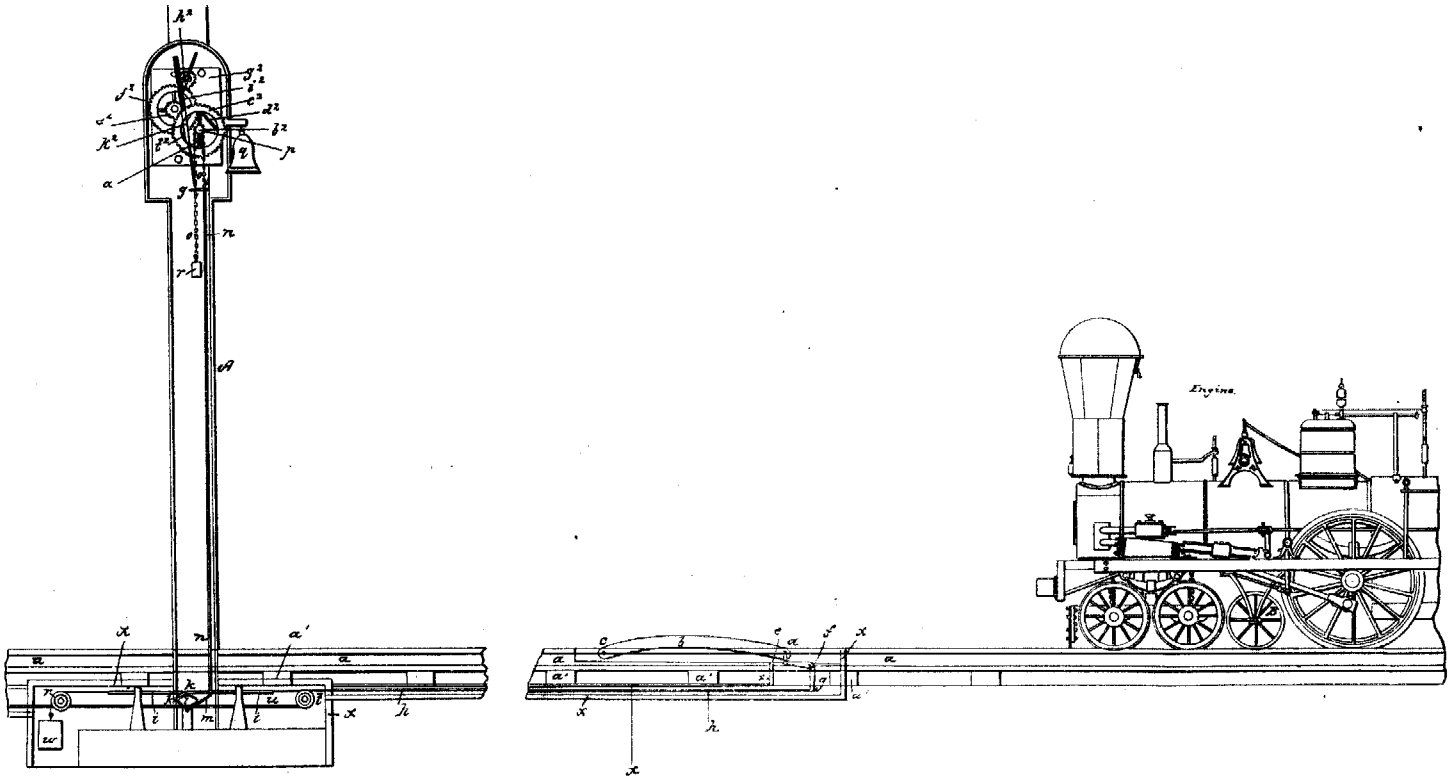
N. PETERS, Photo-Lithographer, Washington, D. C.

UNITED STATES PATENT OFFICE.

SAMUEL NICOLSON, OF BOSTON, MASSACHUSETTS.

IMPROVEMENT IN RAILROAD ALARM-SIGNALS.

Specification forming part of Letters Patent No. 2,145, dated June 26, 1841; Reissue No. 97, dated July 3, 1847.

*To all whom it may concern:*

Be it known that I, the undersigned, SAMUEL NICOLSON, of Boston, in the county of Suffolk and Commonwealth of Massachusetts, gentleman, have invented a new and useful machine which I term a "Railroad-Alarm," of which the following is a full and exact description, reference being had to the drawing hereto annexed or herewith presented as a part thereof.

An auxiliary wheel, B, should be fixed to the side of a locomotive-engine, tender, or car, so as to project about six inches outside of or beyond the railroad-track, the said wheel being made so as to turn freely on its axle or supporting-journal.

At a point about eighty rods or any other required distance from the crossing or place where the alarm is to be sounded or given, and parallel to the adjacent rail of the track, a curved bar or lever, *b*, is arranged, said bar or lever being made to move vertically on a fulcrum or joint, *c*, at one end. The other end of the curved lever *b* is jointed to a turning bolt or link, *e*, which is jointed to the upper end of a crank or bent lever, *f*. The arms of said crank or bent lever *f* should be each about six inches in length, and should stand at or nearly at right angles to each other, and in a position as seen in the drawing.

To the lower end of the lower arm, *g*, a wire, rod, chain, or cord, *h*, is jointed, the same being of such length and size as circumstances may require. Said rod should be extended within a suitable box or casing, (placed along by the side of or below the railway,) and fastened to one end of a horizontal sliding bar, *i*, which should be about four feet in length, and be supported by proper standards or means. A hook or catch, *k*, is jointed to one side of it. To the other end of said bar *i* a cord or chain is fastened, said cord or chain being made to pass over a grooved pulley, *r'*, and have a weight, *w*, attached to it. A sectoral lever, *l*, should be arranged so that its external curve may be directly under the hook *k*. An arm, *m*, of said lever has a chain, *n n o o*, attached to it, said chain being made to extend upward through the post or box A, and to pass over and engage with a toothed groove or wheel, *a'*, of a cylinder, *p*, (of the striking apparatus,) from whence it depends, and has a weight, *r*, hung to it, as seen in the drawing. Said cylinder *p* has a ratchet-wheel, $b^2$, affixed to one end of it, and said cylinder and ratchet are made to freely revolve on a shaft or axle. On the same axle, and next to the ratchet-wheel, a cogged wheel, $c^2$, is fixed, said cogged wheel having a spring-pawl, $d^2$, jointed to it, and made to engage with the aforementioned ratchet-wheel in such manner as to prevent the same and its cylinder from turning around on their common axle, except in one direction. Said cog-wheel drives a cogged pinion, $e^2$, which is fixed in the axle of another cogged wheel, $f^2$, and turns it and said wheel $f^2$. The toothed wheel $f^2$ drives a toothed pinion, $g^2$, whose axle projects through the side of the inclosing case or box A, and has a crank, $h^2$, fixed on its projecting or outer ends. Said crank plays in a fork or slit, $i^2$, made in the upper arm of a pendulum or lever, $k^2$, which is made to vibrate on a fulcrum or pin, $l^2$, placed somewhat below the axle of the crank. The lower ends of said lever or pendulum is made like a hammer, and has a bell, *q*, hung or applied to the post or case A in such a position as to be struck by the pendulum during its vibrations.

When the engine, tender, or car to which the auxiliary wheel first above mentioned is affixed passes over the track and by the curved lever *b*, said auxiliary wheel should be made to roll over the upper surface of the curved lever and depress the end *d* of said lever. When this takes place, it will move backward the arm *g* of the crank *f*, and in such manner as to pull upon the chain or cord *h* and draw back the sliding bar *i* and the catch or hook *k*, and thereby turn the sectoral lever and depress its arm *m*. By this the chain *n n o o* is drawn upon and the weight *r* raised until the catch *k* slips from the sectoral lever-crank *l*, when the weight *r* will be relieved and will fall and put the striking machinery in operation, so as to sound the bell or otherwise give warning. After the auxiliary wheel of the engine or car has passed over and depressed the curved lever, the weight *w* will draw upon the slide-bar *i* and rod *h* and restore the catch *k* and lever *b* to their proper situations for a succeeding passage of an engine and train.

Another curved lever, *b*, and crank *f* may be disposed on the opposite side of the post or box A, and may be made to communicate with the slide *i* by means of a cord or chain, *u*, made to pass under and around a pulley, *t*, and be attached to the slide *i*. In this case the said second curved lever, *b*, should be placed on the opposite side of the railway-track.

The aforesaid machinery or alarm, when analyzed, will be found to be made up of certain elements which have never been combined together before my invention of the same. I do not intend to confine myself or limit my improvement to the employment of the precise details of which each of said elements is herein represented to be composed; but I mean to vary them or increase or diminish them as circumstances may require, at the same time maintaining that or those combinations of parts or elements I claim as my invention for the purpose of sending or giving an alarm previous to the approach of a car or train on a railway or of signalizing the coming thereof in time for travelers at any road-crossing to prepare themselves therefor.

I do not always make use of the curved lever *b*, lever *f*, rod *h*, slide-bar *i*, and catch *k*, or mechanical equivalents therefor, for the purpose of winding up or elevating the weight or any substitute therefor by which the remainder of the striking apparatus is caused to operate and sound the bell or give other warning, as the said parts may sometimes be employed simply to liberate or throw into action the said weight or substitute at such time as it may be necessary to cause it to operate the striking mechanism, it being understood that the weight or its substitute has been previously elevated or prepared to act by some attendant or person at the crossing, and kept out of action by some proper mechanical contrivance, which may be drawn away from it at the proper time by the operation of the auxiliary wheel of the engine or car on the curved lever *b*. I would also remark that the restoring-power—a weight, *w*, operating on the slide *i*—may sometimes be dispensed with, and said slide and parts connected with it may be moved back or restored to place (after a depression of the curved lever) by an attendant or person by any proper means. I mention such changes or variations in order that evil-disposed persons, or those who might be inclined through ignorance of any rights to evade my invention or patent, may be prevented from so doing. I would further remark that although I have described the engine or car of a train to be provided with an auxiliary wheel, I do not always consider this absolutely necessary, as said engine or car may have an arm or some other proper equivalent contrivance applied to it to actuate or depress the curved lever *b* or put in motion the mechanism extending to the ringing machinery; or, instead thereof, the said curved lever or its equivalent may be so made as to be struck or moved by the engine or car without any addition to the same. In this way my apparatus may be modified, while it still comprises the improvement or improvements claimed by me to be my invention.

Having thus set forth my invention or improvements, that which I claim as original with me is as follows:

1. The following elements or members or their mechanical equivalent in combination, viz: first, the bell *q*; second, the striking apparatus; third, the apparatus which extends from the striking apparatus toward and under or by the side of and above the railway, and is actuated by the engine-tender or car of a train of cars for the purpose of winding up the weight of the striking apparatus; fourth, the detaching apparatus, or that by which the weight is supposed to fall and operate the striking apparatus; fifth, the restoring or resetting apparatus, or that by which the various parts of the mechanism are, after each ringing of the bell, restored to the correct positions to be again operated by a succeeding car or train of cars.

2. The lever *b*, crank *f*, rod *h*, slide-rod *i*, and catch *k*, or any equivalent combination, (either with or without a restoring apparatus or weight, *w*,) when applied and operated in the above-described manner by an engine or car for the purpose of liberating or setting in motion or action the power by which the striking apparatus is caused to sound the bell, said power, whether a weight or substitute, being prepared by an attendant or person to operate on such liberation, all as above specified.

In testimony whereof I have hereto set my signature this 15th day of June, A. D. 1847.

SAMUEL NICOLSON.

Witnesses:

R. H. EDDY,

S. W. WALDRON, Jr.